US009348524B1

(12) United States Patent
Bronson et al.

(10) Patent No.: US 9,348,524 B1
(45) Date of Patent: May 24, 2016

(54) MEMORY CONTROLLED OPERATIONS UNDER DYNAMIC RELOCATION OF STORAGE

(71) Applicant: International Business Machines Corporation, Armonk, NY (US)

(72) Inventors: Timothy C. Bronson, Round Rock, TX (US); Garrett M. Drapala, Cary, NC (US); Michael F. Fee, Cold Spring, NY (US); Pak-Kin Mak, Poughkeepsie, NY (US); Arthur J. O'Neill, Poughkeepsie, NY (US); Robert J. Sonnelitter, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 14/547,639

(22) Filed: Nov. 19, 2014

(51) Int. Cl.
*G06F 3/06* (2006.01)
*G06F 12/08* (2016.01)

(52) U.S. Cl.
CPC ............ *G06F 3/0617* (2013.01); *G06F 3/0644* (2013.01); *G06F 3/0647* (2013.01); *G06F 3/0683* (2013.01); *G06F 12/0802* (2013.01); *G06F 2212/1032* (2013.01); *G06F 2212/283* (2013.01); *G06F 2212/608* (2013.01); *G06F 2212/65* (2013.01)

(58) Field of Classification Search
CPC . G06F 3/0617; G06F 12/0802; G06F 3/0647; G06F 3/0683; G06F 3/0644; G06F 2212/65; G06F 2212/283; G06F 2212/608; G06F 2212/1032
See application file for complete search history.

(56) References Cited

U.S. PATENT DOCUMENTS

| 5,317,704 | A | 5/1994 | Izawa | |
|---|---|---|---|---|
| 7,490,214 | B2 | 2/2009 | Cholleti | |
| 7,500,073 | B1 | 3/2009 | Cholleti | |
| 8,285,915 | B2 | 10/2012 | Jacobs | |
| 8,468,289 | B2 | 6/2013 | Hepkin | |
| 2010/0250883 | A1* | 9/2010 | Oshida | G06F 9/5077 711/162 |
| 2014/0366030 | A1* | 12/2014 | Solihin | G06F 9/4856 718/100 |
| 2015/0052327 | A1* | 2/2015 | Ancajas | G06F 3/0647 711/165 |

OTHER PUBLICATIONS

List of IBM Patents or Patent Applications Treated as Related; (Appendix P), Filed Nov. 19, 2014; 2 pages.
Timothy C. Bronson et al., "Dynamic Relocation of Storage", U.S. Appl. No. 14/547,663, filed Nov. 19, 2014.

* cited by examiner

*Primary Examiner* — John Lane
(74) *Attorney, Agent, or Firm* — Cantor Colburn LLP; Margaret McNamara

(57) ABSTRACT

A computing device is provided and includes a plurality of nodes. Each node includes multiple chips and a node controller at which the multiple chips are assignable to logical partitions. Each of the multiple chips includes processors and a memory unit configured to handle local memory operations originating from the processors. The node controller includes a dynamic memory relocation (DMR) mechanism configured to move data having a DMR storage increment address relative to a local one of the memory units without interrupting a processing of the data by at least one of the logical partitions. During movement of the data by the DMR mechanism, the memory units are disabled from handling the local memory operations matching the DMR storage increment address and the node controller handles the local memory operations matching the DMR storage increment address.

20 Claims, 6 Drawing Sheets

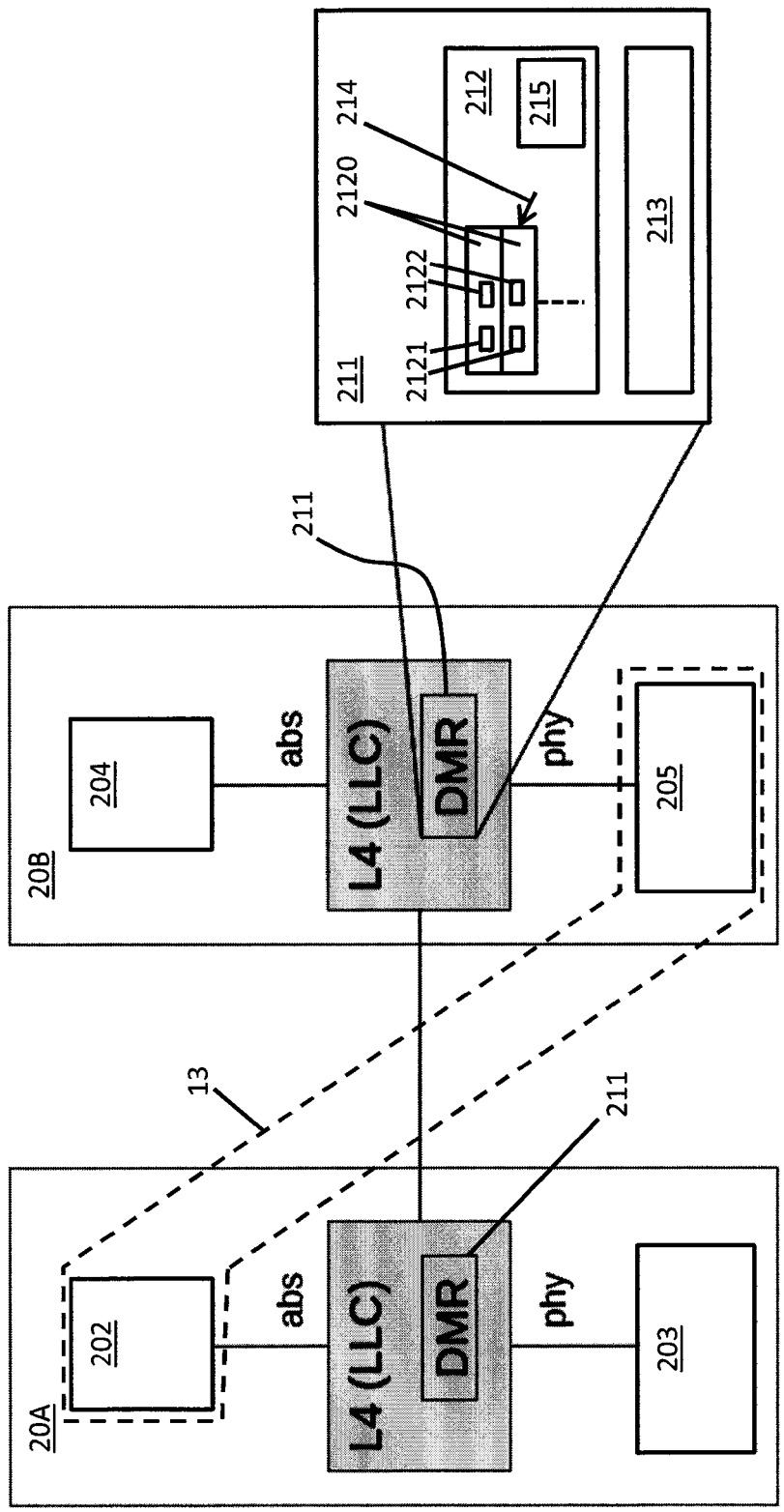

MEMORY CONTROLLED OPERATIONS UNDER DYNAMIC RELOCATION OF STORAGE

BACKGROUND

The present invention relates to dynamic relocation of storage and, more particularly, to dynamic relocation of storage in a main memory of a multi-level cache subsystem.

In certain computing systems and architectures, main memory is a primary resource that hypervisors manage on behalf of logical partitions, or guest operating systems. Similar to compute resources, main memory is limited in size and the main memory needs of a logical partition or operating system may change over time. To better utilize the shared memory resources of a computer system, advanced hypervisors and computer systems support dynamic (i.e., while a partition is active) allocation and de-allocation of storage in fixed size increments. The hypervisors are formed of low-level machine code that runs on processors to manage allocations of logical partitions in terms of dispatching logical processors associated with the partitions as well as the allocation of memory to the logical partitions.

While the means to move logical partitions between different physical compute resources exists, main memory cannot be relocated between physical partitions (e.g., nodes/drawers) for an active logical partition without first disrupting the partition. Typically, a disruption can mean either suspending the partition or the entire system while performing the relocation. Thus, since main memory associated with an active logical partition cannot be moved non-disruptively, optimal resource allocation over time is not obtained and in fact memory resource allocation may become suboptimal over time as compute and memory resource demands change.

SUMMARY

According to an embodiment of the present invention, a computing device is provided and includes a plurality of nodes. Each node includes multiple chips and a node controller at which the multiple chips are assignable to logical partitions. Each of the multiple chips includes processors and a memory unit configured to handle local memory operations originating from the processors. The node controller includes a dynamic memory relocation (DMR) mechanism configured to move data having a DMR storage increment address relative to a local one of the memory units without interrupting a processing of the data by at least one of the logical partitions. During movement of the data by the DMR mechanism, the memory units are disabled from handling the local memory operations matching the DMR storage increment address and the node controller handles the local memory operations matching the DMR storage increment address.

According to another embodiment, a computing device is provided and includes a plurality of nodes, each node comprising multiple chips and a node controller at which the multiple chips are assignable to logical partitions. Each of the multiple chips includes processors and a memory unit configured to handle local memory operations originating from the processors and the node controller moves data having a DMR storage increment address relative to a local one of the memory units without interrupting a processing of the data by at least one of the logical partitions. During movement of the data, the node controller handles the local memory operations matching the DMR storage increment address.

According to yet another embodiment, a computing device is provided and includes a chip and a node controller at which the chip is assignable to a logical partition. The chip includes a processor and a memory unit configured to handle local memory operations originating from the processor and the node controller moves data having a DMR storage increment address relative to the memory unit without interrupting a processing of the data by the logical partitions. During movement of the data, the node controller handles local memory operations matching the DMR storage increment address.

BRIEF DESCRIPTION OF THE SEVERAL VIEWS OF THE DRAWINGS

FIG. 4 is a schematic diagram of a multi-level cache subsystem of a computing device;

DETAILED DESCRIPTION

As will be described below, a mechanism is provided to dynamically relocate storage increments from one physical partition to another, in order to enable defragmentation and physical affinity optimization of active logical partitions in a shared memory computer with multi-level caches. The mechanism provides for interlocks of different levels of a multi-level shared-cache memory subsystem during the dynamic relocation of backing storage and prevents unnecessary speculative prefetching and allows for determinations to be made as to whether a chip is on the old or new memory target node without the knowledge of exactly how many lines in the target storage increment have been moved.

For example, consider a case of logical partition A that is initially allocated compute and memory resources on physical partition 0. If the compute resources are moved to another physical partition, say physical partition 1, then due to system needs it would be optimal from logical partition A's perspective, for the corresponding hypervisor to also move the associated storage from physical partition 0 to physical partition 1. Next, consider logical partition B, with compute and memory resources allocated to physical partition 2 where logical partition B requests additional storage but the nearest available storage is on physical partition 3. The hypervisor will allocate storage on physical partition 3 to fulfill the request; however, if at a later time storage becomes available on physical partition 2, it would be optimal from logical partition B's perspective to move storage from physical partition 3 to physical partition 2. The mechanism described below will allow the hypervisor to complete these actions.

Figure 1:
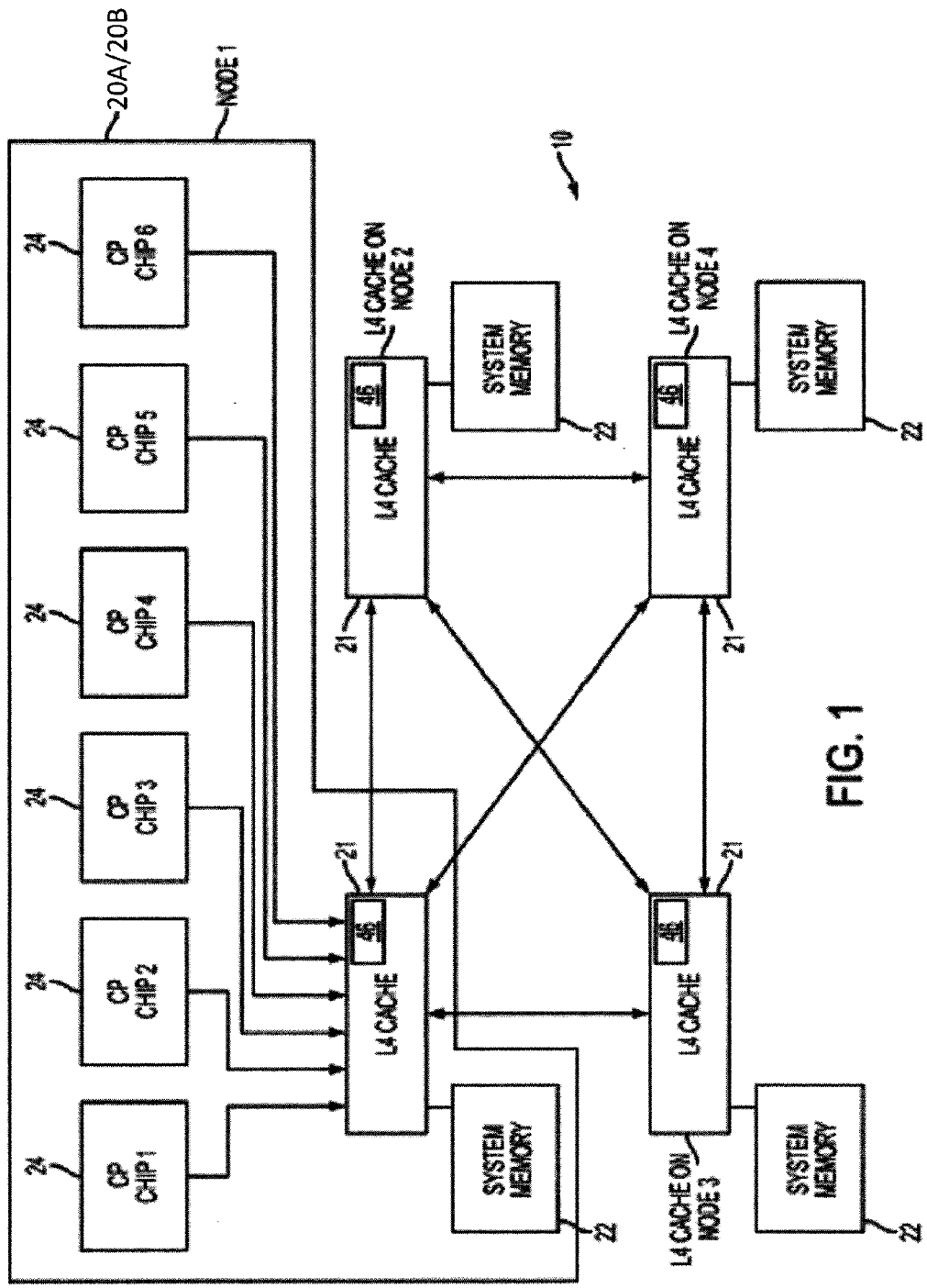
FIG. 1 is a schematic diagram of a computing device in accordance with embodiments.

With reference to FIG. 1, a computing system or computing device 10 is provided and includes a plurality of nodes 20 that are each in communication with one another. Each node 20 includes a portion of system memory 22, which is in communication with a last level or level four (L4) cache 21 on that node 20. As shown in FIG. 1, the computing system 10 may include, for example, four nodes 20 (i.e., Node 1, Node 2, Node 3, and Node 4) although it is understood that any number of multiple nodes may be used as well. Each node includes or is in communication with one or more central processing (CP) chips 24. Because Nodes 2-4 are similar to node 1, only Node 1 is depicted in FIG. 1 in complete detail. However it will be understood that Nodes 2-4 are similarly configured with respect to Node 1 and, for ease of illustration, only the portion of system memory 22 and L4 cache is shown in conjunction with Nodes 2-4.

Figure 2:
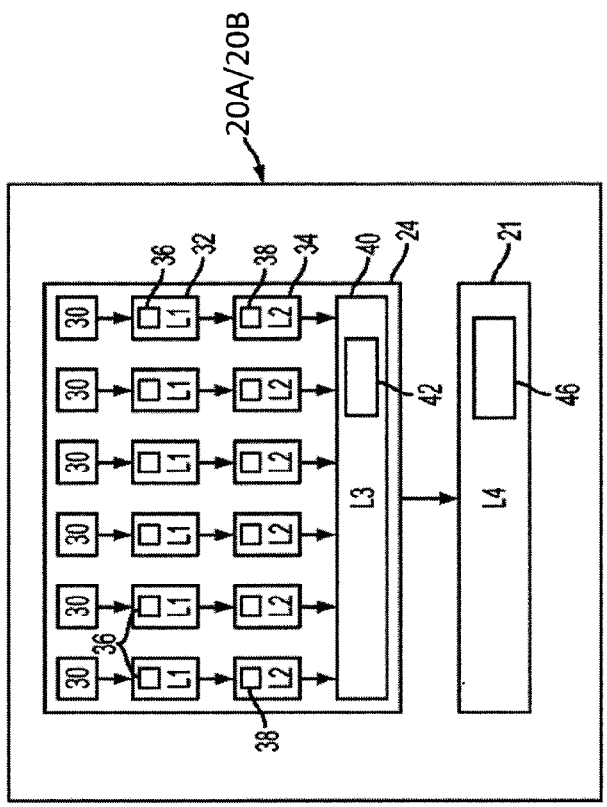
FIG. 2 is a schematic diagram of a portion of the computing device of FIG. 1.

Referring now to FIGS. 1 and 2, each CP chip 24 includes one or more cores 30 for the reading and executing of instructions. For example and, in the embodiment shown in FIG. 2, each CP chip 24 includes six cores 30, however it is understood that any number of cores 30 may be used as well. Each core 30 is operatively coupled to a level one (L1) cache 32 and a level two (L2) cache 34. The L1 caches 32 are coupled to the cores 30, and the L2 caches 34 are coupled to the L1 caches 32. The L1 cache 32 includes an L1 controller 36, and the L2 cache 34 includes an L2 controller 38. Each L2 cache 34 is coupled to a level three (L3) cache 40, where one L3 cache 40 is included in each CP chip 24. Each L3 cache 40 is shared by multiple L2 caches 34. For example and, in the embodiment as shown in FIG. 2, the L3 cache 40 is shared by six L2 caches 34. The L3 cache 40 also includes an L3 controller 42. The level four (L4) cache 21 is shared by one or more L3 caches 40. Each L4 cache 21 includes an L4 cache controller 46. In the embodiment as shown, the node 20 (e.g., Node 1, Node 2, Node 3, and Node 4 shown in FIG. 1) includes six L3 caches 40 which are in communication with the L4 cache 21 on the node.

In accordance with embodiments, the L1 caches 32 may be 1 MB, the L2 caches 34 are 1 MB, the L3 caches 40 are 48 MB, and the L4 caches are variably sized (e.g., 256 MB, 384 MB, 512 MB and/or 1 GB). However, it is to be understood that other sizes may be used as well. It is also understood that although FIGS. 1 and 2 illustrate a multi-level cache hierarchy having four levels of cache, the computing system 10 may include any number of cache levels. It is also understood that while FIGS. 1 and 2 illustrate the highest or last level cache on nodes 20 as L4 caches, the highest level cache on nodes 20 may be a lower or higher cache level (e.g., a L3 cache). Moreover, each node 20 may be configured with a different highest level cache with, for example, one node 20 having an L4 cache as its highest level cache and another node 20 having L3 cache as its highest level cache.

Figure 3:
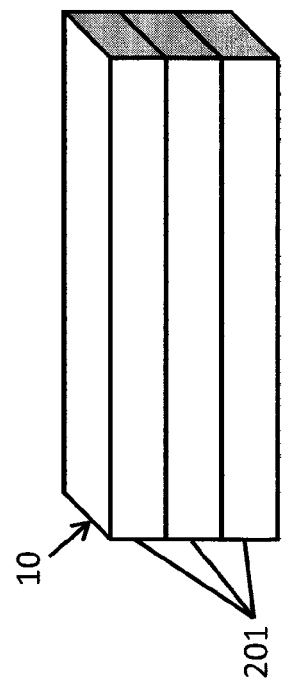
FIG. 3 is a perspective view of a computing device in accordance with embodiments.

With reference to FIGS. 3 and 4, the computing device 10 described above may be configured as an enterprise computing system or a server where the above-mentioned first and second nodes 20 are provided as sub-dividable first and second server levels or drawers 201. As shown in FIG. 4, the first node 20A may include at least first resources 202 and second resources 203 where the first resources 202 are compute resources, such as a CP chip 24 of FIGS. 1 and 2, and the second resources 203 are memory resources, such as the portion of system memory 22 of FIGS. 1 and 2. Similarly, the second node 20B may include at least first resources 204 and second resources 205 where the first resources 204 are compute resources, such as a CP chip 24 of FIGS. 1 and 2, and the second resources 205 are memory resources, such as the portion of system memory 22 of FIGS. 1 and 2.

In accordance with embodiments, it will be understood that since the first and second resources 202 and 203 are provided as components of the first node 20A, the first resources 202 of the first node 20A are closer to and have greater affinity with the second resources 203 of the first node 20A than the second resources 205 of the second node 20B. By contrast, since the first and second resources 204 and 205 are provided as components of the second node 20B, the first resources 204 of the second node 20B are closer to and have greater affinity with the second resources 205 of the second node 20B than the second resources 203 of the first node 20A. Thus, in order to maintain optimal performance levels of the computing device 10, a logical partition to which the first resources 202 of the first node 20A are assigned should have the second resources 203 of the first node 20A also assigned thereto whereas a logical partition to which the first resources 204 of the second node 20B are assigned should have the second resources 205 of the second node 20B also assigned thereto. This is not always the case, however, due to allocations, de-allocations and re-allocations of resources over time.

That is, in accordance with aspects of the invention, computing device 10 may be virtualized to include a logical partition 13 to which at least the first resources 202 of the first node 20A and the second resources 205 of the second node 20B are at least initially allocated. With this or other conditions in effect, one or more of the L4 caches 21 of FIGS. 1 and 2 may be configured to perform DMR spanning at least the first and second nodes 20. In such a case, the hypervisor manages allocations of at least the first and second resources 202 and 203 of the first node 20A and the first and second resources 204 and 205 of the second node 20B. The hypervisor configures a dynamic memory relocation (DMR) mechanism 211 to, for example, move data stored on the second resources 205 (i.e., the source memory resources) of the second node 20B to the second resources 203 (i.e., the target memory resources) of the first node 20A without interrupting a processing of the data by the logical partition 13 with the first resources 202 of the first node 20A.

The DMR mechanism 211 will thus perform DMR to enable processor resource and system memory affinity to enhance system performance and to mitigate scaling issues with computing devices of increasing complexity. Moreover, while memory affinity maintenance can be difficult due to constant dynamic allocation/de-allocation of system resources where available memory for a new partition may not always be local within a same drawer as its compute resources, DMR can transparently re-group memory onto a same drawer 201. Moreover, while traditional methods of suspending the logical partition or the system for relocation have generally operated at around 242 MB per second, 14.2 GB per minute or 1 TB in 1.2 hours, DMR can operate at around 2 GB per second, 120 GB per minute or 1 TB in 8.5 minutes. Given that the computing device 10 may have up to around 3-6 TB or more of maximum memory capacity per drawer 201, the performance capability of DMR exceeds that of traditional methods.

The data to be moved by the DMR mechanism 211 is broken down into cache lines, 256 bytes each in our example, and the source memory location of each cache line (i.e., the physical location of each cache line in the second resources 205 of the second node 20B) can be identified by its initial or "old" physical address. As shown in FIG. 4, the DMR mechanism 211 includes a configuration table 212 and a lookaside entry 213. The configuration table 212 may contain up to 128,000 entries 2120 or more, which are each disposed in a predefined sequence within the configuration table 212. Each entry 2120 may include an absolute storage increment address 2121, which is an address block of 512 MB size, as an example, assigned by the hypervisor to the logical partition 13, and a physical storage increment address 2122, which is the "old" physical address. Thus, each entry 2120 in the configuration table 212 associates an absolute address of the data to be moved with an address identifying an actual storage location of the data. The lookaside entry 213 complements the configuration table 212 and associates the absolute address of the data to be moved with a "new" physical address identifying a target storage location of the data on the second resources 203 of the first node 20A.

In accordance with embodiments, the hypervisor configures the DMR mechanism 211 to generate the configuration table 212 and the lookaside entry 213 at an instance of DMR initialization. This action will be described in greater detail below.

Once DMR is initialized, the DMR mechanism 211 moves one cache line at a time starting from the beginning of the absolute address of the storage increment. In doing so, the DMR mechanism 211 prevents access to the one cache line being moved by the logical partition 13 or by any other logical partition. In accordance with embodiments, the DMR mechanism 211 prevents such access by generation of a pointer 214 and an incrementer 215. The pointer 214 points to the cache line that is currently being moved. Since each discrete movement includes a fetch operation and a write operation, the pointer 214 continues pointing to the cache line until both the fetch operation and the write operation are complete at which point the incrementer 215 bumps the pointer 214 on each node 20 in the computing device 10 to the next sequential cache line.

Any access to the data to be moved by the logical partition 13 or by another entity (e.g., additional logical partitions and hypervisors of other physical partitions) can continue on a general basis by first determining the actual physical location of each cache line, which can be conducted by reviewing the relative position of a given cache line in question to the pointer 214 in the configuration table 212. If a particular cache line is associated with an entry 2120 that is already passed by the pointer 214, the cache line has been moved and the actual physical location of the cache line can be found from the lookaside entry 213. By contrast, if a particular cache line is associated with an entry 2120 that has not yet been passed by the pointer 214, the cache line has not yet been moved and the actual physical location of the cache line can be found from the configuration table 212. If the particular cache line is associated with a sequential entry 2120 that is currently pointed to by the pointer 214, the cache line is in the process of being moved and access will be blocked for the duration of the cache line move (i.e., the time required to complete the fetch and write operations of the cache line). Thus, since the logical partition 13 has continual access to the cache lines within the storage increment being moved, the DMR is substantially transparent to the logical partition 13.

Figure 5:
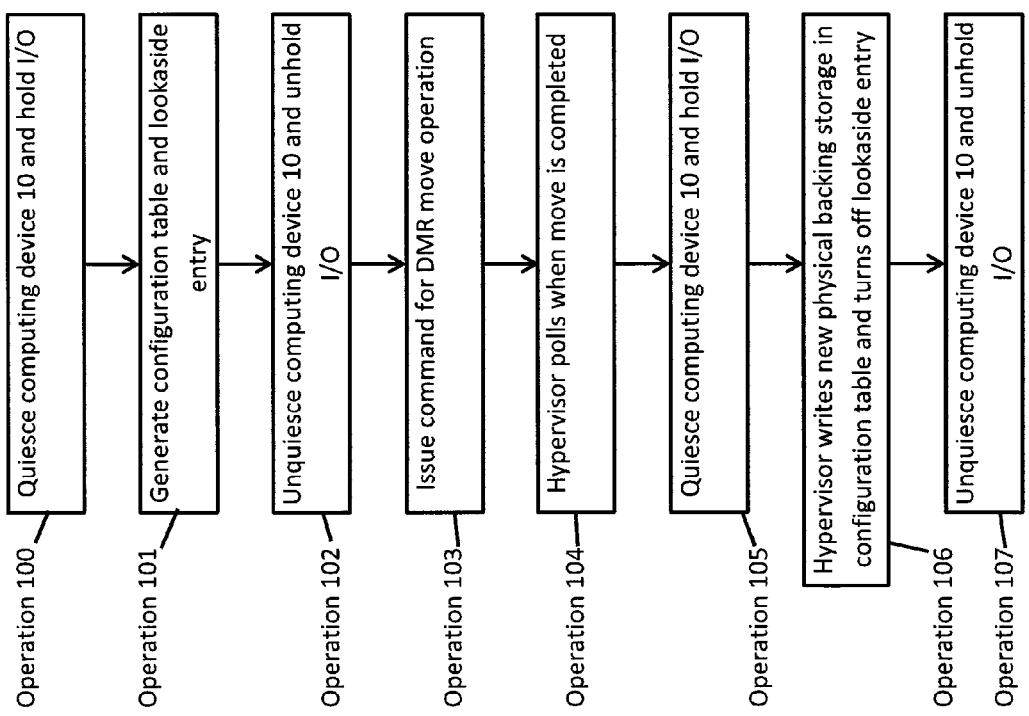
FIG. 5 is a flow diagram illustrating an operation of the multi-level cache subsystem of FIGS. 3 and 4.

With reference now to FIG. 5, a method of operating the computing device 10 described above will now be described. Initially, when the hypervisor determines that DMR is needed, the computing device 10 is quiesced and all input/output (I/O) operations are held (operation 100). Then, the configuration table 212 and the lookaside entry 213 are generated and a DMR move pending status is put in effect on each node 20 and chip 24 to disable memory accesses to the storage increment being moved and to enable address compares to reject key conflicting operations (operation 101). At this point, the computing device is unquiesced and the I/O operations are unheld (operation 102) such that a DMR move operation command for the storage increment can be issued (operation 103). During such a DMR move operation, hardware DMR line fetch and store operations use a same system address and the DMR mechanism 211 maintains the pointer 214 of the lookaside entry 213.

As the process continues, the hypervisor polls the DMR mechanism 211 when the move is completed on all pipes (operation 104) and the computing device 10 is quiesced with the I/O operations held again (operation 105). The hypervisor then writes new physical backing storage in the configuration table 212 and turns off the lookaside entry 213 (operation 106) and the computing device 10 is unquiesced with the I/O operations unheld (operation 107).

Figure 6:
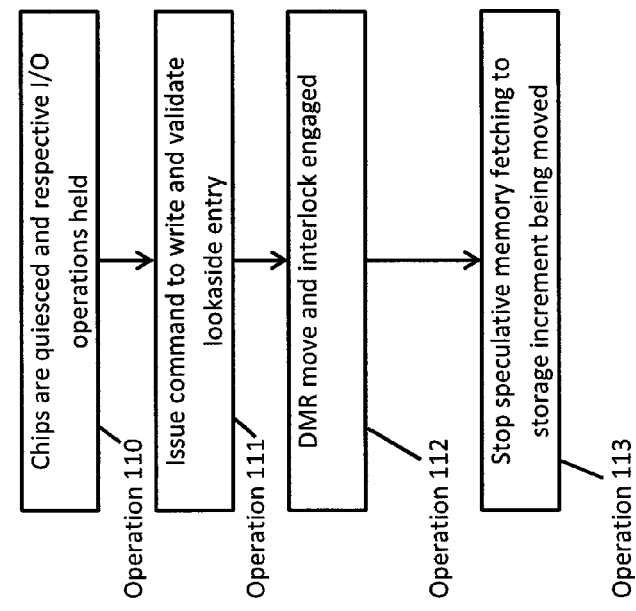
FIG. 6 is a flow diagram illustrating a further operation of the multi-level cache subsystem of FIGS. 3 and 4.

With reference to FIG. 6, a process of setting up the lookaside entry 213 will now be described. Initially, the chips 24 are quiesced and their respective I/O operations are held (operation 110). Then, the hypervisor issues a command to write and validate the lookaside entry 213 throughout the system so that two physical addresses are associated with the moving storage increment (i.e., the source memory resources and the target memory resources) for all DMR mechanisms 211 with the pointer 214 identifying whether a cache line is to be found at its source memory location or its target memory location (operation 111). At this point, with the DMR move now pending on all nodes 20, a DMR move and interlock are engaged (operation 112).

With the DMR move and the interlock engaged in operation 112, speculative memory fetching by chip 24 to the storage increment being moved is stopped (operation 113). That is, local speculative memory fetches are skipped on a lookaside entry 213 hit with the pointer 214 maintained in the DMR mechanism 211 and the DMR mechanism 211 becoming responsible for fetches on a lookaside entry 213 hit. Here, the DMR mechanism 211 will issue speculative memory fetches based on line-based compares until the DMR mechanism 211 is no longer on the target memory node 20.

Figure 7:
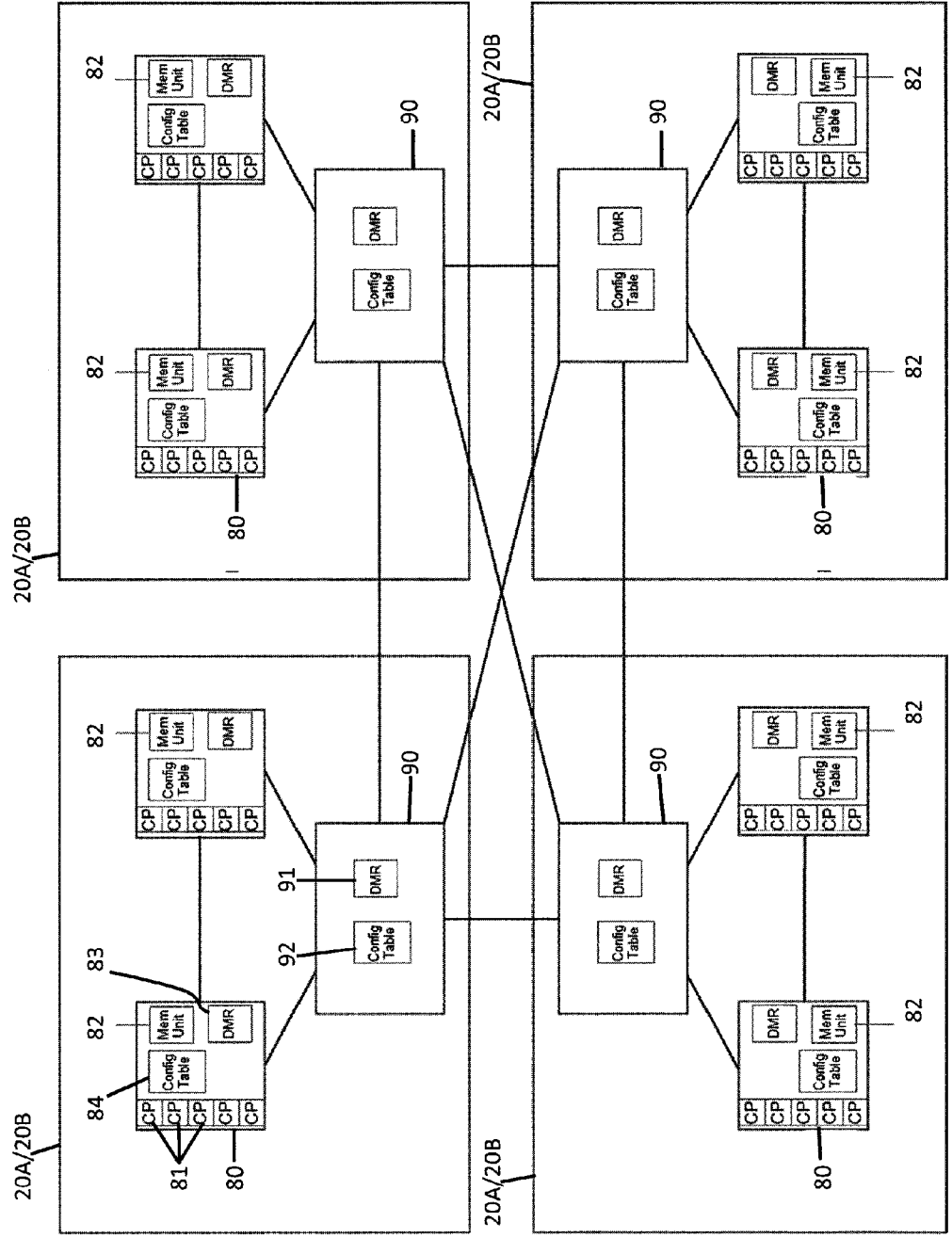
FIG. 7 is a schematic diagram of a computing device in accordance with further embodiments.

In greater detail with reference to FIG. 7 and, in accordance with further embodiments of the invention, the computing device 10 described above includes a plurality of nodes 20 and each node 20 includes multiple chips 80 and a node controller 90 at which the multiple chips 80 are assignable to logical partitions. Each of the multiple chips 80 comprises processors 81 and a memory unit 82 that is configured to handle local memory operations originating from the processors 81. Each of the multiple chips 80 further includes a chip-level DMR mechanism 83 and a chip-level configuration table 84. The node controller 90 includes a node-level DMR mechanism 91 and a node-level configuration table 92. The node-level DMR mechanism 91 is configured to move data having a DMR storage increment address relative to a local one of the memory units 82 without interrupting a processing of the data by at least one of the logical partitions. As will be explained below, during movement of the data by the node-level DMR mechanism 91, the memory units 82 are disabled from handling the local memory operations matching the DMR storage increment address and the node-level DMR mechanism 91 of the node controller 90 handles the local memory operations matching the DMR storage increment address.

With the above configuration, the chip-level configuration tables 84 are present on each of the multiple chips 80 and the node-level configuration table 92 is present on their respective node controller 90. Each of the chip-level configuration tables 84 and the node-level configuration tables 92 include the same absolute address to physical address mapping. Part of that physical address contains node and chip identifier information for the physical memory location. In addition, while the node-level DMR mechanism 91 is substantially similar to the DMR mechanism 211 described above, the chip-level DMR mechanisms 83 include a capability to review lookaside entry registers and include a comparator to compare memory fetches and stores against DMR relocation addresses, the chip-level DMR mechanisms 83 may not include the pointer/incrementer functionality described above. Thus, the chip-level hardware does not know which cache line is currently being moved or how much of the DMR storage increment has/has not been moved. That is, the chip-level hardware only knows that a storage increment is being moved and must rely on the node controller 90 to handle all memory fetch and store operations that originate from within the local node 20.

It should be understood that there are three primary reasons why the chip-level hardware would not be the same as the node-level hardware. The first reason is that the node controllers 90 communicate with each other on all coherent operations when requests cannot be satisfied by a cache within a node 20. As such, by having the node controllers 90 drive DMR sequences, much of the existing hardware necessary to relocate storage increments dynamically is being re-used, which is to say the protection of the cache line being relocated is for the most part based on the same protection that already exists to deal with the case when multiple processors are requesting access to the same data. The second reason is that extending DMR pointer functionality and information down to the chip level slows down DMR processing time as an extra step needed for the node controller 91 to send pointer values to memory units 82. Third, keeping pointer/incrementer functionality at the node level is a simpler and more efficient design, hardware wise.

Typically, for memory fetch operations originating from the processors 81 residing within the node 20 (same processor chip as well as direct-attached processor chips), the corresponding memory unit 82 looks up its copy of the chip-level configuration table 84 to determine the node and chip identifier from the physical address associated with the absolute address of the fetch request. If the node and chip identifier points to itself the memory unit does an immediate memory prefetch operation in parallel to the fetch request being broadcast out by the local node controller 90 to the peer node controllers 90 to determine if the fetch request exists in other nodes 20. The "prefetch" implies an early fetch to memory before the system wide cache hit/miss status is known. If there is a hit, the cached data is returned to the processor 81 and the prefetched memory data is dropped. If there is no hit then the data from the prefetch will be returned to the processor 81. Normally, the local node controller 90 does not do any memory prefetches on behalf of fetch requests originating from processors 81 within its node 20. However, the node controller 90 in this type of system is responsible for forwarding memory fetch requests from other nodes 20 if the target node and chip identifier (from the associated storage increment address in the node-level configuration table 92) points to a local memory unit 82.

In DMR mode, the behavior described above is modified. When the request address targets the same storage increment address that is set up in the lookaside entry (i.e., the lookaside entry 213 described above), the memory units 82 do not know the position of the pointer 214 of the DMR move and cannot be depended on for processing the requests at the right physical memory location. Thus, all memory operations for local (i.e., same node 20) requests that match the DMR storage increment address (not just the cache line address) are handled by the node controller 90. The node controller 90 compares the line address of the request against its DMR pointer 214 and picks the physical address, particularly the node and chip identifier, either from the node-level configuration table 92 or the lookaside entry 213 to determine the actual location of the physical memory stored data based on the result of the comparison. After the DMR mechanism 91 completes the storage increment relocation (1 GB of stored data) the memory units 82 resume handling of local memory operations until the next DMR move.

Figure 8:
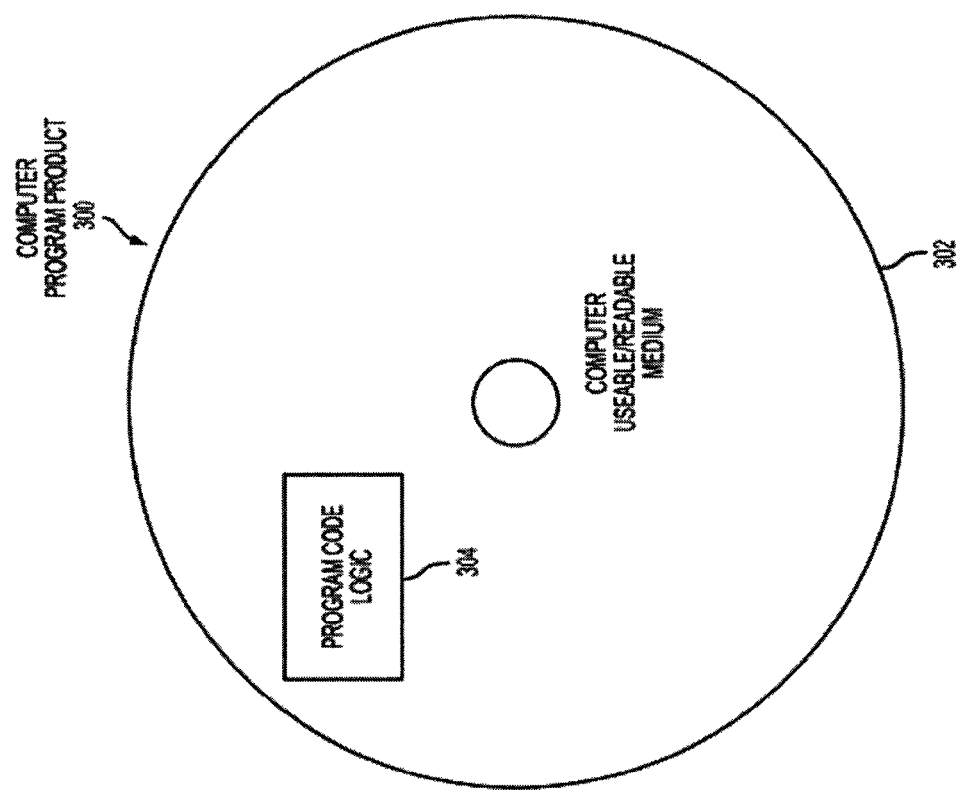
FIG. 8 illustrates a computer program product in accordance with embodiments.

Referring now to FIG. 8, in one example, a computer program product 300 includes, for instance, one or more storage media 302, wherein the media may be tangible and/or non-transitory, to store computer readable program code means or logic 304 thereon to provide and facilitate one or more aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A computing device, comprising:
a plurality of nodes, each node comprising multiple chips and a node controller at which the multiple chips are assignable to logical partitions;
each of the multiple chips comprises processors and a memory unit configured to handle local memory operations originating from the processors and the node controller comprises a dynamic memory relocation (DMR) mechanism configured to move data having a DMR storage increment address relative to a local one of the memory units without interrupting a processing of the data by at least one of the logical partitions;
wherein, during movement of the data by the DMR mechanism, the memory units are disabled from handling the local memory operations matching the DMR storage increment address and the node controller handles the local memory operations matching the DMR storage increment address.

2. The computing device according to claim 1, wherein the data comprises an entire storage increment.

3. The computing device according to claim 1, wherein the node controller further comprises a configuration table and each of the multiple chips further comprises a configuration table, which has a same absolute-to-physical address mapping as the configuration table of the node controller with node and chip identifier information.

4. The computing device according to claim 3, wherein each of the multiple chips further comprises a DMR mechanism having different hardware than the DMR mechanism of the node controller.

5. The computing device according to claim 4, wherein the DMR mechanism of the node controller comprises:
a pointer that identifies a cache line of the data being moved; and
an incrementer configured to move the pointer from the cache line to another;
wherein the pointer is absent from the DMR mechanisms of each of the multiple chips.

6. The computing device according to claim 4, wherein the DMR mechanisms of each of the multiple chips comprise:
lookaside entries that associate an absolute address with an address identifying a storage location of the data; and
a comparator configured to compare memory fetches and stores against a relocation address.

7. The computing device according to claim 1, wherein the local memory requests comprise memory fetch operations.

8. The computing device according to claim 1, wherein the memory unit handles the local memory operations by performing a prefetch operation before a system-wide cache hit or miss status of the local memory operations is known.

9. A computing device, comprising:
a plurality of nodes, each node comprising multiple chips and a node controller at which the multiple chips are assignable to logical partitions;
each of the multiple chips comprises processors and a memory unit configured to handle local memory operations originating from the processors and the node controller moves data having a DMR storage increment address relative to a local one of the memory units without interrupting a processing of the data by at least one of the logical partitions;
wherein, during movement of the data, the node controller handles the local memory operations matching the DMR storage increment address.

10. The computing device according to claim 9, wherein the data comprises an entire storage increment.

11. The computing device according to claim 9, wherein the node controller further comprises a configuration table and each of the multiple chips further comprises a configuration table, which has a same absolute-to-physical address mapping as the configuration table of the node controller with node and chip identifier information.

12. The computing device according to claim 11, wherein each of the multiple chips further comprises a DMR mechanism.

13. The computing device according to claim 12, wherein the node controller comprises:
a pointer that identifies a cache line of the data being moved; and
an incrementer configured to move the pointer from the cache line to another;
wherein the pointer is absent from the DMR mechanisms of each of the multiple chips.

14. The computing device according to claim 12, wherein the DMR mechanisms of each of the multiple chips comprise:
lookaside entries that associate an absolute address with an address identifying a storage location of the data; and
a comparator configured to compare memory fetches and stores against a relocation address.

15. The computing device according to claim 9, wherein the local memory requests comprise memory fetch operations.

16. The computing device according to claim 9, wherein the memory unit handles the local memory operations by performing a prefetch operation before a system-wide cache hit or miss status of the local memory operations is known.

17. A computing device, comprising:
a chip; and
a node controller at which the chip is assignable to a logical partition;
the chip comprising a processor and a memory unit configured to handle local memory operations originating from the processor and the node controller moves data having a DMR storage increment address relative to the memory unit without interrupting a processing of the data by the logical partition;
wherein, during movement of the data, the node controller handles local memory operations matching the DMR storage increment address.

18. The computing device according to claim 17, wherein the data comprises an entire storage increment.

19. The computing device according to claim 18, wherein the node controller further comprises a configuration table and the chip further comprises:
a configuration table, which has a same absolute-to-physical address mapping as the configuration table of the node controller and a DMR mechanism.

20. The computing device according to claim 19, wherein the node controller comprises:
a pointer that identifies a cache line of the data being moved; and
an incrementer configured to move the pointer from the cache line to another,
wherein the pointer is absent from the DMR mechanisms of each of the multiple chips.

* * * * *